United States Patent [19]
Spolander
[11] Patent Number: 4,667,983
[45] Date of Patent: May 26, 1987

[54] PAPER BLOCK OR PAD AND A METHOD OF PRODUCING IT

[75] Inventor: Sven I. Spolander, Elmsford, N.Y.
[73] Assignee: Bind-O-Matic AB, Sweden

[21] Appl. No.: 755,261
[22] PCT Filed: Nov. 7, 1984
[86] PCT No.: PCT/SE84/00380
§ 371 Date: Jul. 2, 1985
§ 102(e) Date: Jul. 2, 1985
[87] PCT Pub. No.: WO85/02146
PCT Pub. Date: May 23, 1985
[30] Foreign Application Priority Data
Nov. 8, 1983 [SE] Sweden ............ 8306130
[51] Int. Cl.[4] ............ B42D 5/00; B42D 15/00; B32B 31/00; B42C 1/00
[52] U.S. Cl. ............ 281/15 R; 281/21 R; 281/38; 156/366; 412/17
[58] Field of Search ............ 281/15 R, 15 B, 21 R, 281/35, 36, 38; 412/3, 17; 156/477 B, 366

[56] References Cited

U.S. PATENT DOCUMENTS

| | | | |
|---|---|---|---|
| 576,385 | 2/1897 | Valentine | 272/33 B |
| 1,086,978 | 2/1914 | Anderson | 281/15 R |
| 1,733,048 | 10/1929 | Beale | 281/38 |
| 3,159,411 | 12/1964 | McKowen | 281/36 |
| 3,775,867 | 12/1973 | Christenberry | 281/15 R |
| 3,847,718 | 11/1974 | Watson | 281/21 R |
| 4,305,605 | 12/1981 | Vine | 281/35 |
| 4,367,061 | 1/1983 | Wiholm | 412/17 |
| 4,367,116 | 1/1983 | Wiholm | 156/366 |
| 4,492,306 | 1/1985 | Cooper et al. | 281/38 |
| 4,519,629 | 5/1985 | Podosek | 412/3 |

FOREIGN PATENT DOCUMENTS

| | | | |
|---|---|---|---|
| 331083 | 8/1903 | France | 281/15 R |

*Primary Examiner*—Paul A. Bell
*Assistant Examiner*—Paul M. Heyrana, Sr.
*Attorney, Agent, or Firm*—Christel, Bean & Linihan

[57] ABSTRACT

A block or pad comprising a folder with two covers (1,2) joined to each other by a spine (3), on the inside of which a thermosetting binder in the form of a strip (6) has been attached and also comprising a sheaf of papers (8), one side edge of which is joined to the inside of the spine via the strip. At least some of the sheets joined to the inside of the spine (3) are provided with weakening lines (7) parallel to, and at a small distance from portions of the sheet which remain joined to the strip. The invention also relates to a method of producing the block or pad.

5 Claims, 2 Drawing Figures

PAPER BLOCK OR PAD AND A METHOD OF PRODUCING IT

DESCRIPTION

1. Technical Field

The present invention relates to a paper block or pad comprising a folder having two covers joined to each other by a spine, on the inside of which a thermosetting binder in the form of a strip is attached, and also comprising a plurality of paper sheets, the edges of which are joined to the inside of the spine via the strip. The invention also relates to a method of manufacturing such a block or pad.

2. Background Art

Covers for a block or pad of the kind described above, and a method of manufacturing such folders are already known from such as the U.S. Pat. No. 4,367,061. The folders are often of high quality and usually comprise a transparent front cover with a back cover and spine of cardboard. The folders are used as covers for documents such as tenders, surveys and advertising material, and for this reason they must have a pleasing appearance and good strength properties. For these reasons the folders will be comparatively expensive to manufacture, and it is therefore not natural to use them for binding a plurality of paper sheets of poorer quality. Neither is it suitable to use such folders for bindning in sheets which are to be removed therefrom, since removal must take place by tearing out the sheet, since there is no other way of removing it from the inside of the spine. Such tearing results in that the sheet itself becomes torn in undesired places or is given a remaining very uneven torn edge, which very often results in essential information on the sheet being lost.

So-called spiral blocks or pads are also known, which have a spiral as retaining means for a plurality of paper sheets, these sheets being provided with weakening lines parallel, and adjacent to the spiral. These blocks or pads are suitable for such uses as note, writing or sketch blocks or pads and their sheets are intended to be removed by tearing off along the weakening lines. Removal often means that the sheets are torn out at their connection to the spiral.

Blocks and pads are also known having a glue ribbon for keeping the sheets together instead of the spiral. These are also used as note pads or the like, and their sheets are intended to be removed along weakening lines parallel to the glue ribbon. So that tearing off does not take place at the ribbon, it is necessary that the weakening lines are situated at a relatively great distance from the bead, so that the user can hold the remaining strip-like part when the sheet shall be torn away from the remaining sheets, and this results in unnecessary waste of paper.

DISCLOSURE OF INVENTION

One object of the present invention is to surmount the disadvantages with previously known blocks or pads and the method of manufacturing them, and to provide and produce a block or pad comprising a high-quality folder in the spine of which sheets of paper are attached; at least some of these sheets being removable from the spine along a uniform tear-off edge without the sheet in question, adjacent sheets or the folder being damaged. This object is achieved by the invention having been given the distinguishing features disclosed in the claims.

PREFERRED EMBODIMENT

Figure 1:
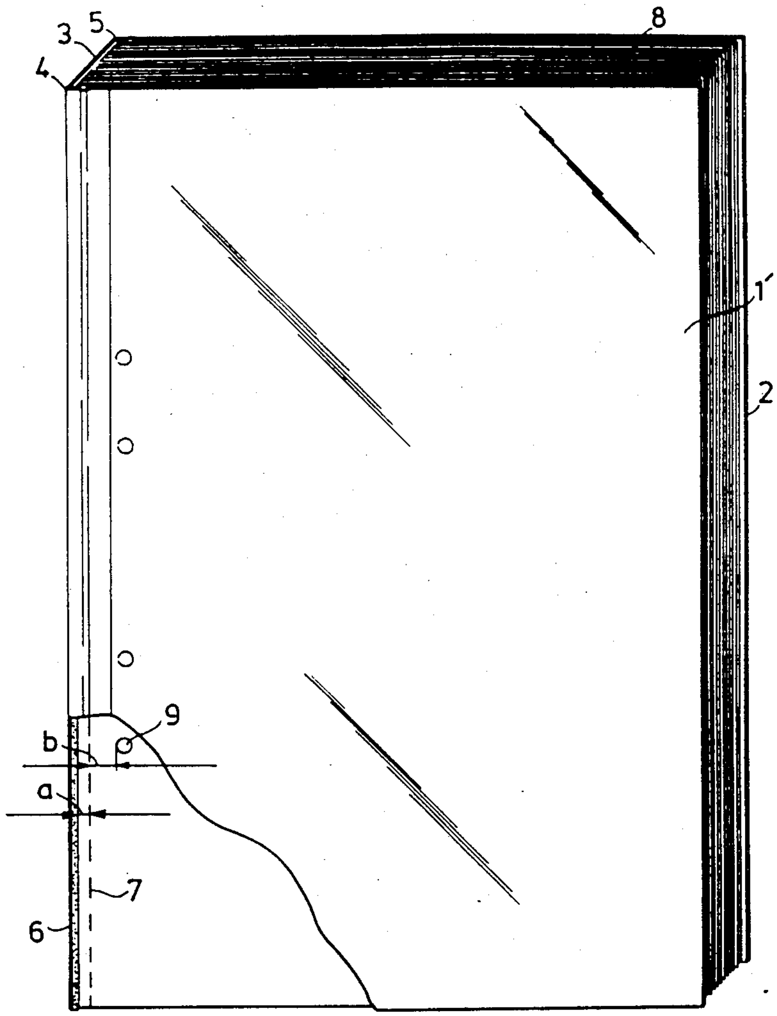
FIG. 1 is a partially cut-away perspective view of a block or pad in accordance with the invention and FIG. 2 is a perspective view of a folder included in the block or pad according to FIG. 1.
Figure 2:
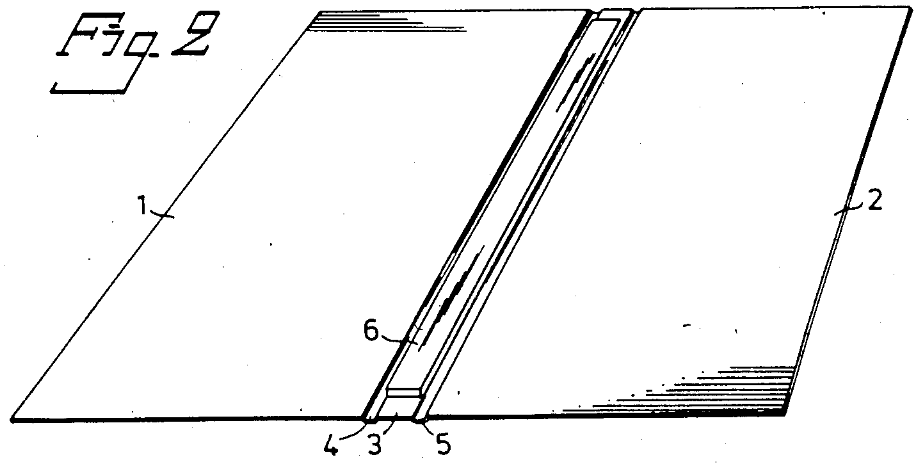

A folder of the kind illustrated in FIG. 2 is the basis for manufacturing the block or pad illustrated in FIG. 1. The folder consists of two covers 1 and 2 and a spine 3 between them. The covers and spine are illustrated in FIG. 2 as being manufactured in one piece from cardboard or carton with crease lines 4 and 5 between the covers and spine. A thermosetting binder is attached to the inside of the spine 3 in the form of a strip 6. The strip 6, which is solid at room temperature, is attached to the spine 3 by the strip being heated so that it becomes viscous, when it is pressed against the inside of the spine.

The ready block or pad is illustrated in FIG. 1 and includes a folder corresponding to the one in FIG. 2 but with the sole difference that the cover 1 is replaced by a transparent cover 1' attached to the spine 3 in the vicinity of the crease line 4. The cover 1' enables the uppermost sheet in a plurality of sheets 8 to be observed without the cover needing to be turned away from the paper sheets, one side edge of the sheets being attached to the inside of the spine 3 with the aid of the glude strip 6.

The sheets 8 suitably have the same format as the cover. At least some of these sheets, which are intended to be removed from the block by a user, are each provided with a weakening line, preferably in the form of a perforation 7 along one long side and in the immediate vicinity of the edge attached to the glue strip 6 (spine 3). It has been found that in the ready-manufactured block the distance a between the perforation 7 and the portions of the glue strip 6 farthest removed from the spine 3 should be less than 5 mm and preferably only 1–2 mm, so that as large a part of the sheet as possible may be utilized, and so that the sheets will not be creased along the perforations 7 after the plurality of sheets has been taken into engagement against the glue strip, and heating the latter is in progress. If the distance a is greater than what has been given above, and the thickness of the plurality of sheets is substantially less than the distance between the covers 1 and 2 at the level where the perforations are situated, there is the risk that the creasing of the sheets along the perforations results in incomplete or incorrect attachment of the sheets to the strip 6. The proximity of the sheets 7 to the glue strip 6 also results in that when a sheet is torn off, the risk is very small that the sheet is torn along any other, uneven, indefinite line, and that tearing off of a sheet takes place along the perforation independent of whether the sheet is retained by the hand in a position substantially parallel to and a short distance from the rest of the plurality of papers, or in any other position, such as at right angles to the papers or with about 180° separation from the position illustrated in FIG. 1.

The plurality of sheets 8 may contain sheets which are perforated as well as those that are not perforated. If all the sheets are perforated and squared and/or lined, and the top cover is transparent, an exclusive writing pad is obtained, the uppermost sheet of which can always be observed in spite of its being situated under the top cover. The perforated sheets may also be printed forms, which are intended to be torn off for certain purposes. Forms, note sheets and any other sheets of varying sizes and thicknesses, which are perforated or unperforated, can be combined in a desired manner into a sheaf of papers entirely according to the desires of the user, which makes the block or pad usable for many different purposes. Certain, or all sheets may also be provided with four holes 9, making later hole punching unnecessary for sheets which are intended to be placed in conventional ring files or the like after being torn from the block or pad. The distance b of these holes from the perforation 7 should be as small as possible so as not to unnecessarily encroach on the surface of the sheet intended for, or to be provided with, information. Since it is ensured by the invention that tearing off a sheet always takes place along the perforation 7, the holes 9 may be placed much closer to it than is usual. The distance is suitably less than 8 mm and preferably about 6 mm. Since the distance a between the strip 6 and the perforation 7 as well as the distance b between the latter and the holes 9 is small, there is thus obtained the maximum area utilizable for information on the sheet.

In manufacturing the block or pad according to FIG. 1, the covers 1 and 2 are first folded towards each other along the crease lines 4 so that the folder assumes the shape of a U or a V. The folder is then placed with the outside of the spine 3 resting against a heat-generating substructure in an apparatus e.g. of the kind illustrated and described in the U.S. Pat. No. 4,367,116. Sheets provided with the perforations 7 along one of their long side edges are put together, optionally together with unperforated and/or hole-punched sheets to a sheaf of sheets, the thickness of which is somewhat less than the width of the spine 3. The sheaf is then inserted between the covers 1 and 2 so that its side edge, to which the perforations are adjacent, comes into engagement with the glue strip 6. After a given time, the strip has partially melted and the edges of the sheaf have sunk into the melted glue, possibly into contact with the inside of the spine 3. When this has taken place the folder with the sheaf of papers lying within is removed from the apparatus and after cooling, whereon the glue solidifies, the plurality of papers is firmly joined to the folder spine and the ready block of sheets may be used for the purpose intended.

Only one embodiment of the invention has been described and illustrated on the drawing, but it should be understood that the invention is not limited to this embodiment and is restricted solely by the disclosures in the claims.

I claim:

1. A paper block or pad comprising:

a folder having two covers joined to each other by a spine on the inside of which is a strip of thermosetting binding material; and a sheaf of papers, at least some of the papers being provided with a weakening line in the form of perforations parallel to and at a distance not less than 2 mm nor more than 10 mm from one side edge of the paper, said perforations being in alignment with each other, the one side edge of the sheets of paper being firmly attached to the strip of thermosetting binding material, the thermosetting binding material adhering only between the one side edge and the perforations.

2. The paper block or pad as set forth in claim 1 wherein at least some of the papers provided with a weakening line are further provided with holes situated at a distance which is less than 8 mm from the weakening lines, the weakening lines lying between the one side edge of the sheets and the holes.

3. The paper block or pad as set forth in claim 1 wherein one cover of the folder is transparent and at least the sheet of papers nearest this cover is provided with weakening lines.

4. A method of producing a paper block or pad comprising the following steps:

providing a folder having two covers joined to each other by a spine on the inside of which is a strip of thermosetting binding material;

selecting a plurality of sheets at least some of which are provided with a weakening line in the form of perforations parallel to and at a distance of not less than 2 mm nor more than 10 mm from one side edge of the sheet;

assembling a plurality of said sheets to form a sheaf of papers with the perforations in juxtaposed relationship;

inserting said sheaf of papers into said folder with said one side edge of the sheets of papers being disposed adjacent said strip of thermosetting binding material;

applying heat to the outside of the spine to melt the strip of thermosetting binding material to such an extent that the thermosetting material may adhere to said sheaf upon cooling but only between the one side edge and the perforations; and cooling the assembly.

5. A method of producing a paper block or pad comprising the following steps:

providing a folder having two covers joined to each other by a spine on the inside of which is a strip of thermosetting binding material, one of said covers being transparent;

selecting a plurality of sheets at least some of which are provided with a weakening line in the form of perforations parallel to and at a distance of not less than 2 mm nor more than 10 mm from one side edge of the sheets, at least some of the sheets provided with a weakening line also being provided with noles situated at a distance which is less than 8 mm from the weakening line, the weakening line lying between said holes and said one side edge;

assembling a plurality of said sheets to form a sheaf of papers with the perforations in juxtaposed relationship, one of the outermost sheets being provided with a weakening line;

inserting said sheaf into said folder with said one side edge of the sheets of papers being disposed adjacent said strip of thermosetting binding material and the outermost sheet with a weakening line being disposed adjacent the transparent cover;

applying heat to the outside of the spine to melt the strip of thermosetting binding material to such an extent that the thermosetting material may adhere to said sheaf upon cooling but only between the one side edge and the perforations; and cooling the assembly whereby the sheaf of papers is firmly attached to the inside of the spine via the strip of thermosetting binding material.

* * * * *